US011909061B2

(12) United States Patent
DeKeuster et al.

(10) Patent No.: US 11,909,061 B2
(45) Date of Patent: Feb. 20, 2024

(54) MODULAR APPROACH FOR ADVANCED BATTERY MODULES HAVING DIFFERENT ELECTRICAL CHARACTERISTICS

(71) Applicant: CPS Technology Holdings LLC, New York, NY (US)

(72) Inventors: Richard M. DeKeuster, Racine, WI (US); Robert J. Mack, Milwaukee, WI (US); Stephen D. Cash, Cary, IL (US)

(73) Assignee: CPS Technology Holdings LLC, New York, NY (US)

( * ) Notice: Subject to any disclaimer, the term of this patent is extended or adjusted under 35 U.S.C. 154(b) by 403 days.

(21) Appl. No.: 17/089,540

(22) Filed: Nov. 4, 2020

(65) Prior Publication Data

US 2021/0057695 A1 Feb. 25, 2021

Related U.S. Application Data

(62) Division of application No. 14/501,095, filed on Sep. 30, 2014, now abandoned.

(51) Int. Cl.
*H01M 50/26* (2021.01)
*H01M 50/267* (2021.01)
(Continued)

(52) U.S. Cl.
CPC ......... *H01M 50/267* (2021.01); *H01M 4/485* (2013.01); *H01M 4/505* (2013.01);
(Continued)

(58) Field of Classification Search
None
See application file for complete search history.

(56) References Cited

U.S. PATENT DOCUMENTS 6,074,775 A 6/2000 Gartstein et al.
6,118,248 A 9/2000 Nebrigic et al.
(Continued)

FOREIGN PATENT DOCUMENTS

CN 1864329 A 10/2004
CN 102473871 5/2012
(Continued)

OTHER PUBLICATIONS

International Search Report and Written Opinion of the International Search Authority for PCT/US2015/035571, dated Nov. 9, 2015.

*Primary Examiner* — Jonathan G Leong
*Assistant Examiner* — Tony S Chuo
(74) *Attorney, Agent, or Firm* — Boardman & Clark LLP

(57) ABSTRACT

Present embodiments include a series of lithium battery modules having a plurality of electrochemical cells having different electrical characteristics such as voltages and/or capacities. The battery modules are each constructed using components, architectures, production methods, among other things, in common with each other. The lithium ion battery modules may include a first battery module type having a first capacity and a first voltage, a second battery module type having a second capacity and a second voltage, and, in some embodiments, additional battery module types (e.g., a third battery module type having a third capacity and a third voltage) having different voltages and/or capacities. The lithium ion battery modules may all have the same footprint.

11 Claims, 9 Drawing Sheets

(51) Int. Cl.
  H01M 10/0525 (2010.01)
  H01M 10/42 (2006.01)
  H01M 4/505 (2010.01)
  H01M 4/485 (2010.01)
  H01M 4/525 (2010.01)
  H01M 50/271 (2021.01)
  H01M 10/6563 (2014.01)
  H01M 10/625 (2014.01)
  H01M 10/613 (2014.01)
  H01M 50/249 (2021.01)
  B60L 50/64 (2019.01)
  H01M 50/209 (2021.01)

(52) U.S. Cl.
  CPC ....... H01M 4/525 (2013.01); H01M 10/0525 (2013.01); H01M 10/425 (2013.01); H01M 50/271 (2021.01); B60L 50/64 (2019.02); H01M 10/613 (2015.04); H01M 10/625 (2015.04); H01M 10/6563 (2015.04); H01M 50/209 (2021.01); H01M 50/249 (2021.01); H01M 2220/20 (2013.01); Y02E 60/10 (2013.01); Y02P 70/50 (2015.11); Y02T 10/70 (2013.01)

(56) References Cited

U.S. PATENT DOCUMENTS

| | | |
|---|---|---|
| 6,163,131 A | 12/2000 | Gartstein et al. |
| 6,165,646 A | 12/2000 | Takada et al. |
| 6,168,883 B1 | 1/2001 | Urry |
| 6,198,250 B1 | 3/2001 | Nebrigic et al. |
| 6,406,812 B1 | 6/2002 | Dreulle et al. |
| 6,835,491 B2 | 12/2004 | Nebrigic et al. |
| 7,504,799 B2 | 3/2009 | Hamada et al. |
| 7,531,270 B2 | 5/2009 | Buck et al. |
| 7,605,562 B2 | 10/2009 | Kim |
| 7,678,493 B2 | 3/2010 | Morita et al. |
| 7,687,173 B2 | 3/2010 | Cucukcu et al. |
| 8,097,352 B2 | 1/2012 | Fuse |
| 8,115,454 B2 | 2/2012 | Faranda et al. |
| 8,409,744 B2 | 4/2013 | Ijaz et al. |
| 8,603,660 B2 | 12/2013 | Houchin-Miller et al. |
| 8,691,421 B2 | 4/2014 | Lee et al. |
| 2007/0026318 A1 | 2/2007 | Kishi |
| 2008/0111508 A1 | 5/2008 | Dasgupta |
| 2010/0285344 A1 | 11/2010 | Plummer |
| 2011/0070475 A1 | 3/2011 | Thomas |
| 2011/0189521 A1 | 8/2011 | Lee et al. |
| 2011/0206948 A1 | 8/2011 | Asai et al. |
| 2011/0300426 A1 | 12/2011 | Iwasa et al. |
| 2011/0300427 A1 | 12/2011 | Iwasa et al. |
| 2012/0100401 A1 | 4/2012 | Yasui |
| 2012/0231318 A1 | 9/2012 | Buck et al. |
| 2012/0237799 A1 | 9/2012 | Jiang |
| 2013/0020999 A1 | 1/2013 | Whitacre |
| 2013/0059185 A1 | 3/2013 | Whitacre et al. |
| 2013/0196205 A1 | 8/2013 | Silk et al. |
| 2013/0207456 A1 | 8/2013 | Anferbauer et al. |
| 2013/0216874 A1 | 8/2013 | Endo et al. |
| 2013/0344371 A1 | 12/2013 | Kinoshita et al. |
| 2014/0154535 A1 | 6/2014 | Olsson |

FOREIGN PATENT DOCUMENTS

| | | | |
|---|---|---|---|
| CN | 202405373 | 8/2012 | |
| CN | 102903876 | 1/2013 | |
| CN | 103187584 A | 7/2013 | |
| CN | 103201180 A | 7/2013 | |
| EP | 2725652 | 4/2014 | |
| KR | 20130025246 A | * 3/2013 | ........ H01M 10/0404 |

* cited by examiner

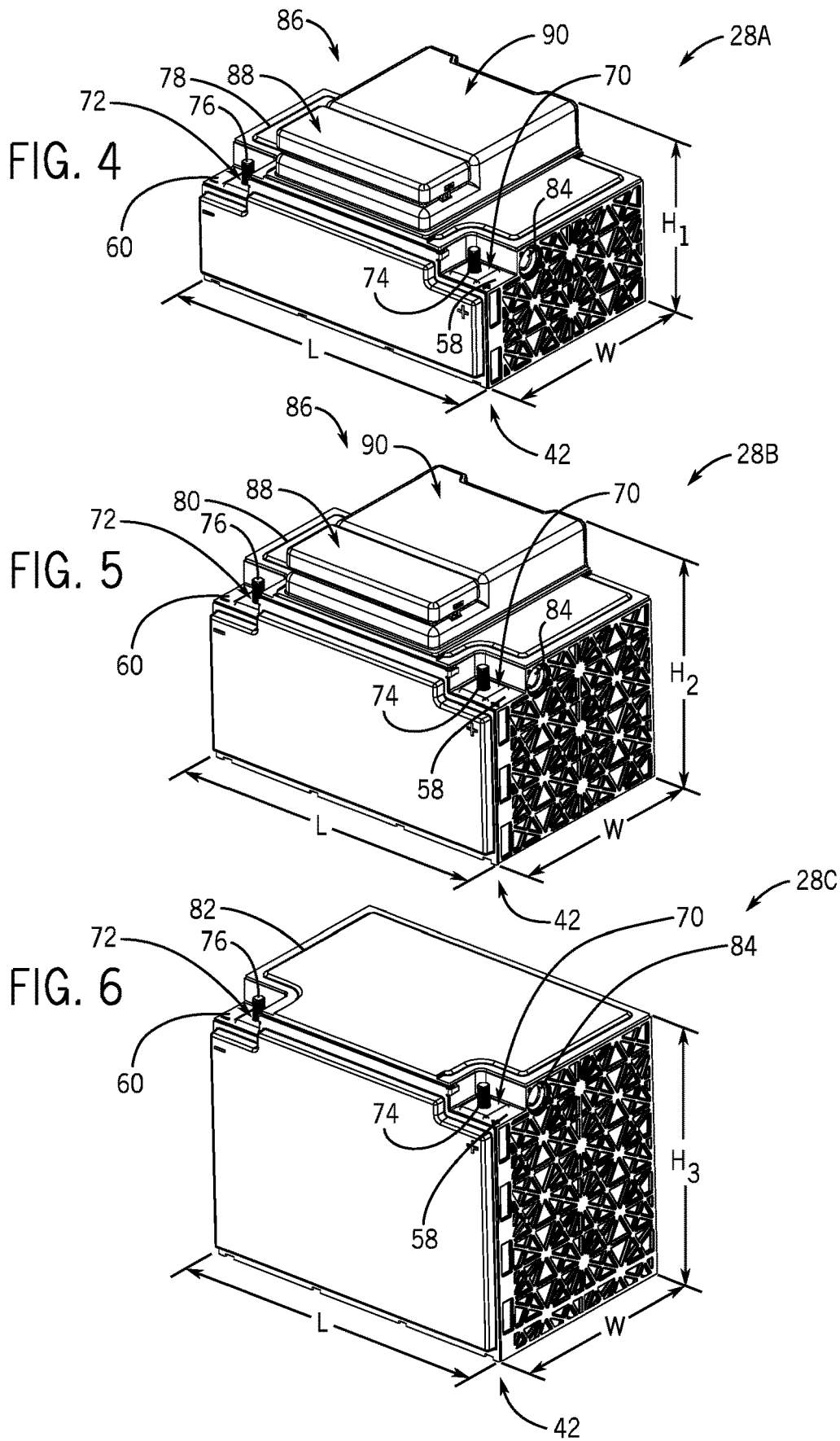

MODULAR APPROACH FOR ADVANCED BATTERY MODULES HAVING DIFFERENT ELECTRICAL CHARACTERISTICS

CROSS REFERENCE TO RELATED APPLICATION

This application claims priority as a divisional of U.S. patent application Ser. No. 14/501,095 filed Sep. 30, 2014, entitled "Modular Approach for Advanced Battery Modules Having Different Electrical Characteristics," the content of which is incorporated herein by reference in its entirety.

BACKGROUND

The present disclosure relates generally to the field of batteries and battery modules. More specifically, the present disclosure relates to water management features for Lithium-ion (Li-ion) battery modules.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles and other implementations. For example, traditional battery modules may be constructed on an individually-designed basis, meaning that each traditional battery module may be designed for a specific implementation (e.g., voltage and capacity). Accordingly, each type of traditional battery module may use components specifically selected for that module. It is now recognized that in traditional approaches, it may be difficult to construct battery modules for different applications, but using a shared approach and source of components for the modules. Indeed, it is now recognized that it may be desirable to provide battery modules that utilize a set of common (shared) components, and other shared features.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed toward a series of battery modules having a plurality of electrochemical cells (which may also be referred to as battery cells herein) having different voltages and/or capacities, where the battery modules are each constructed using components, architectures, production methods, among other things, in common with each other. For example, in certain implementations of the present approach, the battery modules may include a first battery module type having a first capacity and a first voltage, a second battery module type having a second capacity and a second voltage, and, in some embodiments, additional battery module types (e.g., a third battery module type having a third capacity and a third voltage) having different voltages and/or capacities.

For example, in one aspect, the present disclosure relates to a lithium ion battery module product portfolio, including a first lithium ion battery module product having a first housing configured to receive a first set of prismatic electrochemical cells, the housing including a base having a first footprint; a second lithium ion battery module product having a second housing configured to receive a second set of prismatic electrochemical cells, the second housing including a base having a second footprint that is substantially the same as the first footprint. A vertical profile opposing the base of the first and second housings is different for each of the first and second lithium ion battery module products, and each prismatic electrochemical cell of the first and second sets of prismatic electrochemical cells conforming to the same manufacturing specifications. The first housing of the first lithium ion battery module product is sized to fit a first number of the prismatic electrochemical cells, the second housing of the second lithium ion battery module product is sized to fit a second number of the prismatic electrochemical cells, and the first and second numbers of the prismatic lithium ion electrochemical cells are different. The lithium ion battery module product portfolio also includes a component configured to interchangeably couple with a first region of the first housing of the first lithium ion battery module product and a second region of the second housing of the second lithium ion battery module product, the first and second regions having corresponding locations on the first and second housings.

In another aspect, the present disclosure also relates to a method of manufacturing lithium ion battery modules. The method includes producing a first lithium ion battery module by a first process that includes disposing a first number of prismatic electrochemical cells having a set of standardized dimensions in a first housing, the first housing having a first base with a length and a width, and electrically connecting the first number of prismatic electrochemical cells such that the first lithium ion battery module has a first voltage and a first capacity. The method also includes producing a second battery module by a second process, the second process including disposing a second number of prismatic electrochemical cells having the set of standardized dimensions in a second housing different from the first housing, the second housing having a second base with the length and the width, and electrically connecting the second number of prismatic electrochemical cells such that the second lithium ion battery module has a second voltage and a second capacity. The first process and the second process collectively comprise using a type of component configured to interchangeably couple with a first region of the first housing of the first lithium ion battery module and a second region of the housing of the second lithium ion battery module, the first and second regions having the same location on their first and second housings, respectively.

In yet another aspect, the present disclosure also relates to a lithium ion battery module product portfolio, including a first lithium ion battery module product having a first layout. The first layout includes a first module housing configured to house a first set of electrochemical cells. The first module housing includes a first top portion having terminals configured to provide a voltage output of the first lithium ion battery module product, a first base disposed opposite the top portion and having a set of dimensions; and a first cell receptacle region disposed between the first top portion and the first base, the first cell receptacle region being configured to receive the first set of electrochemical cells in an orientation. The system also includes a second lithium ion battery module product having a second layout, the layout including a second module housing configured to house a second set of electrochemical cells, the second set of electrochemical cells having a greater number of electrochemical cells compared to the first set of electrochemical cells. The second module housing includes a second top portion having terminals configured to provide a voltage output of the second lithium ion battery module, a second base disposed opposite the second top portion and having the same set of dimensions as the first base, and a second cell receptacle region disposed between the second top portion and the second base, the second cell receptacle region being configured to receive the second set of electrochemical cells in the orientation. The system further includes a plurality of components configured to interchangeably couple with a plurality of corresponding first regions of the first battery module housing and a plurality of corresponding second regions of the second module housing, and the first and second layouts are such that the corresponding first and second regions have the same location on their respective housings.

DRAWINGS

FIG. 4 is a perspective view of an embodiment of the lithium ion battery module of FIG. 2 having various components that may be used in other versions of a lithium ion battery module, in accordance with an aspect of the present disclosure;

FIG. 5 is a perspective view of an embodiment of the lithium ion battery module of FIG. 2 having various components that may be used in other versions of a lithium ion battery module, in accordance with an aspect of the present disclosure;

FIG. 6 is a perspective view of an embodiment of the lithium ion battery module of FIG. 2 having various components that may be used in other versions of a lithium ion battery module, in accordance with an aspect of the present disclosure;

DETAILED DESCRIPTION

Figure 1:
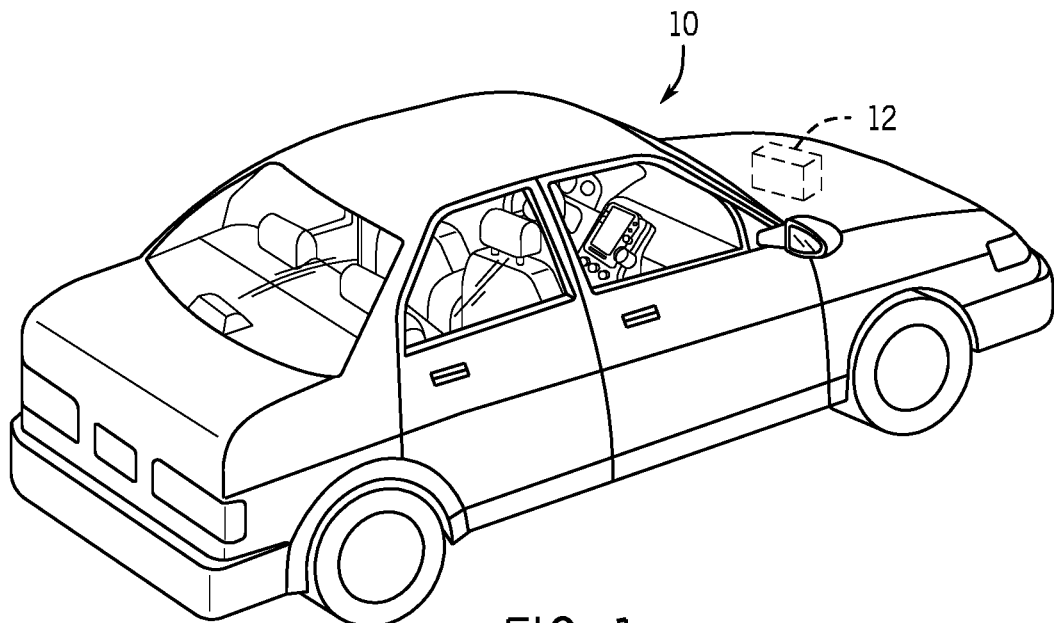
FIG. 1 is a perspective view of an xEV having a battery system configured in accordance with present embodiments to provide power for various components of the xEV, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., Lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Present embodiments are directed toward a lithium ion battery module product portfolio including a series of battery module products having a plurality of electrochemical cells (which may also be referred to as battery cells) having different electrical characteristics such as voltages and/or capacities, where the battery module products are each constructed using components, architectures, production methods, among other things, in common with each other. For example, in certain implementations of the present approach, the battery module products (also referred to herein individually as a "battery module" and collectively as "battery modules") may include a first battery module type (e.g., a first battery module product) having a first capacity and a first voltage, a second battery module type (e.g., a second battery module product) having a second capacity and a second voltage, and, in some embodiments, additional battery module types (e.g., a third battery module type or product having a third capacity and a third voltage) having different voltages and/or capacities.

Again, the battery module types (e.g., a battery module products) may differ in voltage and/or capacity, but may have a number of similar components that may be utilized in any of the different designs in a modular fashion. For instance, these modular components may include, but are not limited to, battery cells, terminals, bus bar connections, shunt bridges, side plugs, fans, low voltage connectors, relays, printed circuit boards (PCBs), and fan filters.

Not only are the same types of components used across the different battery module types or products, but the battery module types also include housings that, while different in terms of the number of battery cells they may hold, ultimately include features that perform the same functions in substantially the same way. That is, the different battery module types include similar design concepts for their respective housings, including similar receptacles for the similar components and, in some embodiments, a similar layout.

Though there may be two, three, or more different battery module types depending, for example, on the number of battery cells utilized in the battery module and the manner in which they are connected, the present embodiments are described in the context of two or three battery modules (which are also battery module products as described herein). For example, two battery modules may have a similar voltage rating but different capacities, and a third battery module may have a different voltage but the same capacity as one of the other two battery modules. However, any combination of overlapping voltages and/or capacities is encompassed by the present disclosure.

As set forth above, in certain xEV contexts (among others, such as non-automotive or stationary energy expending applications), a 12 V output from a lithium ion battery module may be desirable to power certain types of components (e.g., similar types of components traditionally powered by a traditional lead acid battery in traditional vehicles), while a 48 V output may be more suitable to power other types of components that may require a higher voltage, such as an air conditioning system. With this in mind, it is now recognized that the present battery module embodiments may be particularly applicable to such types of battery modules.

By way of non-limiting example, the different battery modules constructed in accordance with the modular approaches described herein may include a first battery module type having a voltage of 12V and a capacity of 10 Amp hours (Ah), a second battery module type having a voltage of 12V and a capacity of 20 Ah, and a third battery module type having a voltage of 48V and a capacity of 10 Ah.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

It is now recognized that it is desirable for a non-traditional battery system 12 (e.g., a lithium ion car battery) to be largely compatible with traditional vehicle designs. In this respect, present embodiments include various types of battery modules for xEVs and systems that include xEVs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
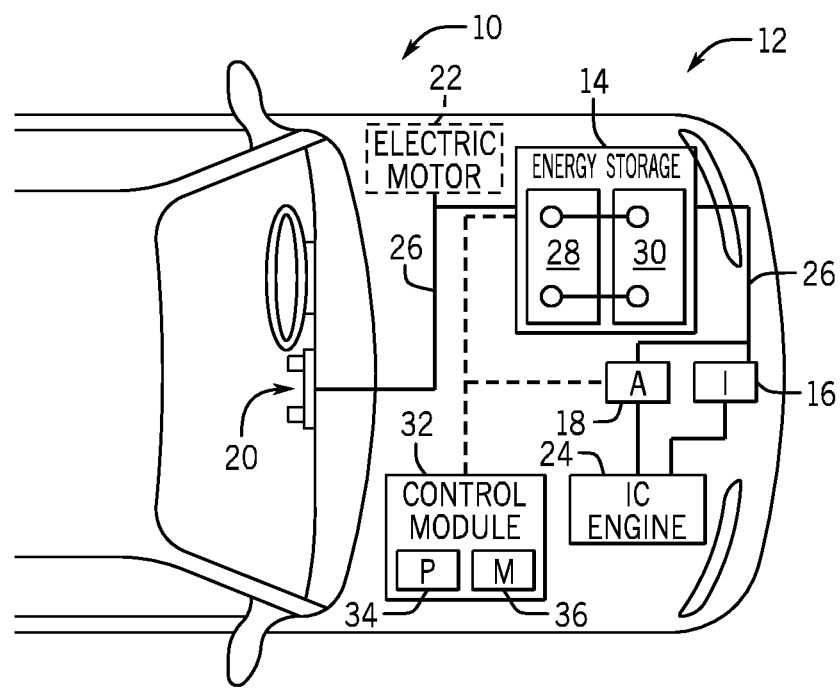
FIG. 2 is a cutaway schematic view of an embodiment of the xEV having a start-stop system that utilizes the battery system of FIG. 1, the battery system having a lithium ion battery module, in accordance with an aspect of the present disclosure.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lithium ion (e.g., a first) battery module 28 and a lead-acid (e.g., a second) battery module 30, which each includes one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or processor 34 and one or more memory 36. More specifically, the one or more processor 34 may include one or more application specific integrated circuits (ASICs), one or more field programmable gate arrays (FPGAs), one or more general purpose processors, or any combination thereof. Additionally, the one or more memory 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

It should be noted that presently disclosed embodiments may be applicable to any battery module having the same or different configurations and/or orientations described above and in detail below. One of ordinary skill in the art would recognize that the components and examples used to describe battery modules in accordance with the present disclosure should not be construed to limit the present disclosure to those components and examples alone. Rather, the disclosed examples are merely intended to serve as non-limiting examples to facilitate discussion of the present disclosure.

Figure 3:
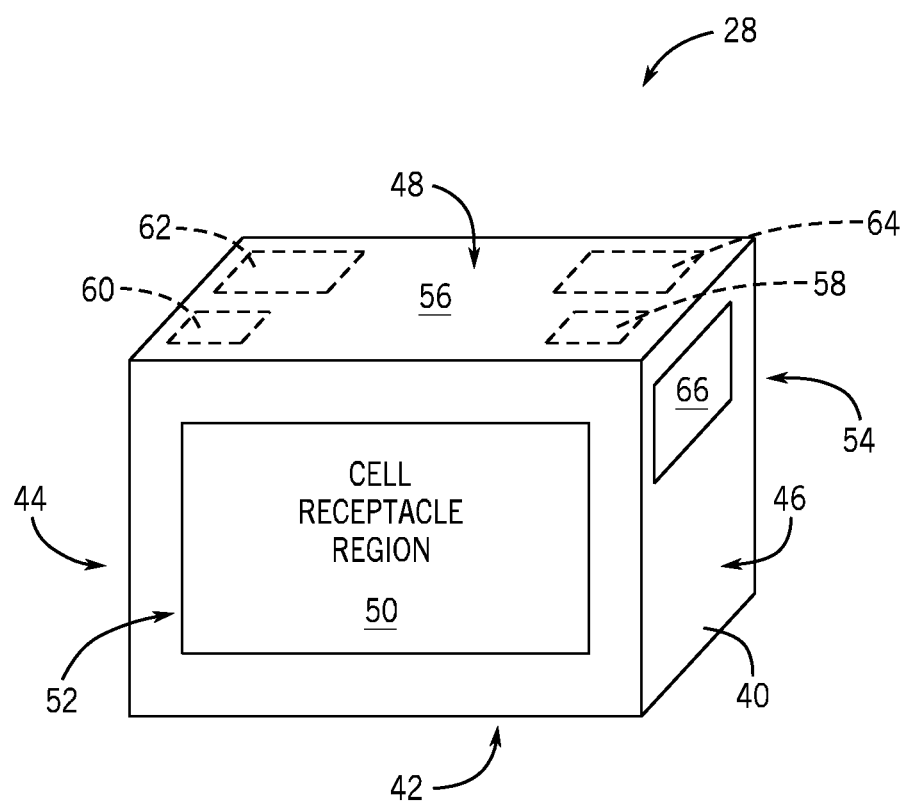
FIG. 3 is a schematic representation of a layout of an embodiment of the lithium ion battery module of FIG. 2, in accordance with an aspect of the present disclosure.

As set forth above, in accordance with the present disclosure, different types of the lithium ion battery module 28 (e.g., a lithium ion battery module product portfolio including different lithium ion battery module products) may utilize components of the same type and may have similar geometrical features (e.g., layout, overall architecture). An example embodiment of the layout of the lithium ion battery module 28 is illustrated in FIG. 3. Specifically, the illustrated embodiment of the lithium ion battery module 28 includes a housing 40, which is intended to represent a one-piece housing or a multi-piece housing (e.g., two-piece, three-piece, or more). To facilitate discussion, different sections of the housing 40 (which may or may not correspond to sections of the overall lithium ion battery module 28) may be defined as follows: a base 42, which may also be referred to as a bottom portion and generally defines the footprint of the lithium ion battery module 28 when placed in operation (e.g., in the xEV 10), sides including a left side 44 and a right side 46, and a top region or top portion 48. The top portion 48 is generally opposite the base 42, with the sides generally extending between the two. The left side 44 and right side 46 are determined, in the illustrated embodiment, with reference to a cell receptacle region 50, which may be considered to correspond to a front end 52 of the lithium ion battery module 28. As described in further detail below, the cell receptacle region 50 is configured to receive a plurality of battery cells (e.g., prismatic electrochemical cells) in a particular orientation. A back end 54 of the lithium ion battery module 28 may be considered to correspond to an end opposite the cell receptacle region 50 (and, accordingly, opposite the front end 52). In accordance with present embodiments, these different sections of the lithium ion battery module 28 may have substantially the same layout and/or configuration across multiple versions, meaning that similar components (e.g., components from the same source), referred to as components of the same type, may be located in these regions. It should be noted that the battery module 28 of FIG. 3 is intended to represent multiple versions (e.g., individual products of a product portfolio), also referred to as embodiments or types, of lithium ion battery modules having the same regions located in the same (e.g., corresponding from a location standpoint) portion of the battery module relative to all other features of the battery module. For example, a region of the lithium ion battery module 28 of FIG. 3 is intended to represent first, second, third, fourth, and so on, regions of the housing 40 corresponding to first, second, third, fourth, and so on, respective embodiments of the battery module 28.

In accordance with the present disclosure, the phrase "common component" or "shared component" is intended to denote a component that can be interchangeably coupled for use in a set of different types of the lithium ion battery module 28, where the component is provided from a common source. For instance, a source of a particular one component such as a particular relay, a particular bus bar, a particular battery cell, and so forth, may be interchangeably used in the different types of lithium ion battery modules 28 set forth herein. That is, common or shared components are interchangeable, and have dimensions to within manufacturing tolerances of their common source.

Figure 9A:
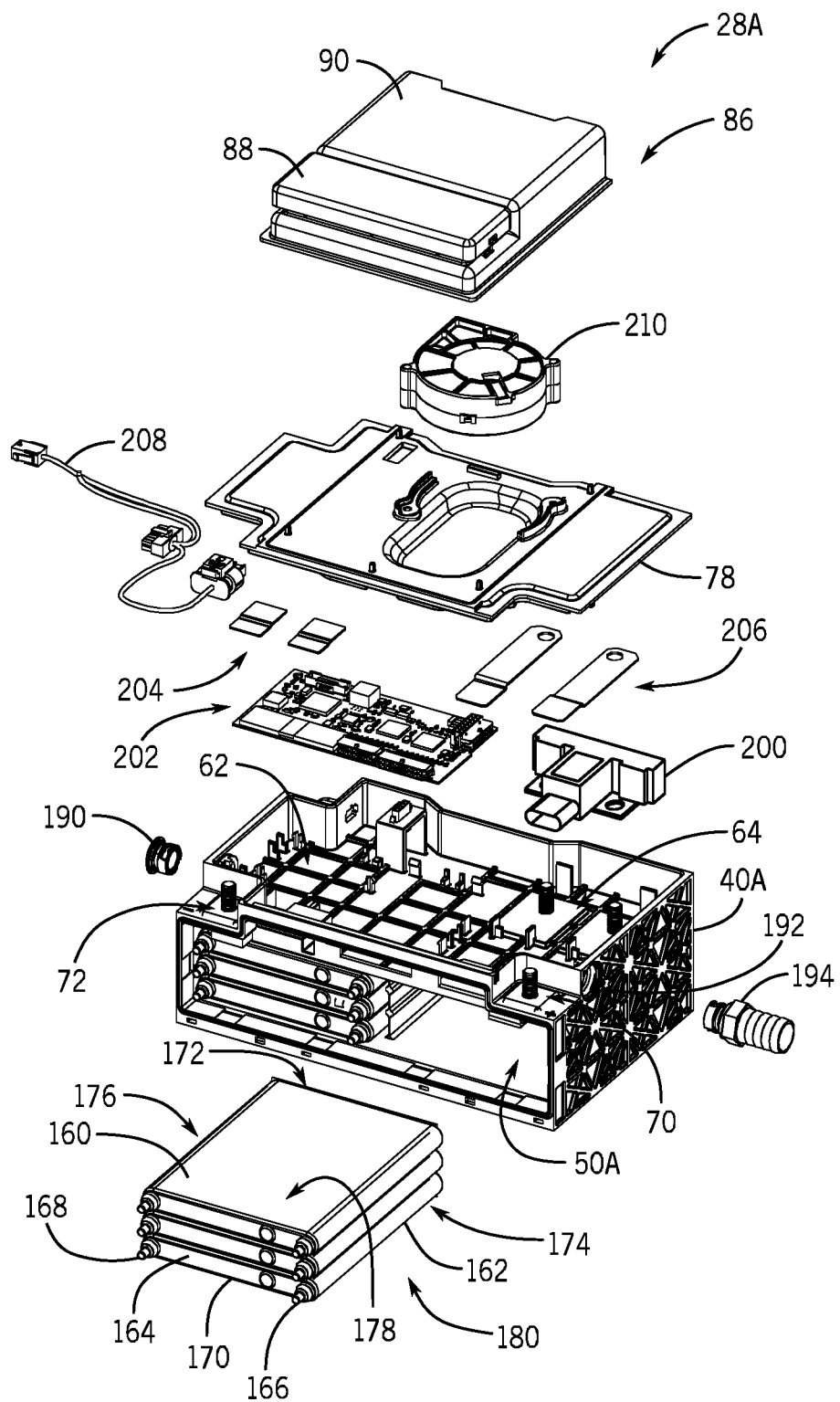
FIG. 9 (FIGS. 9A and 9B) is a combined exploded perspective view of the embodiments of the lithium ion battery modules of FIGS. 4 and 5 and highlighting various shared components between the modules, in accordance with an aspect of the present disclosure.
Figure 9B:
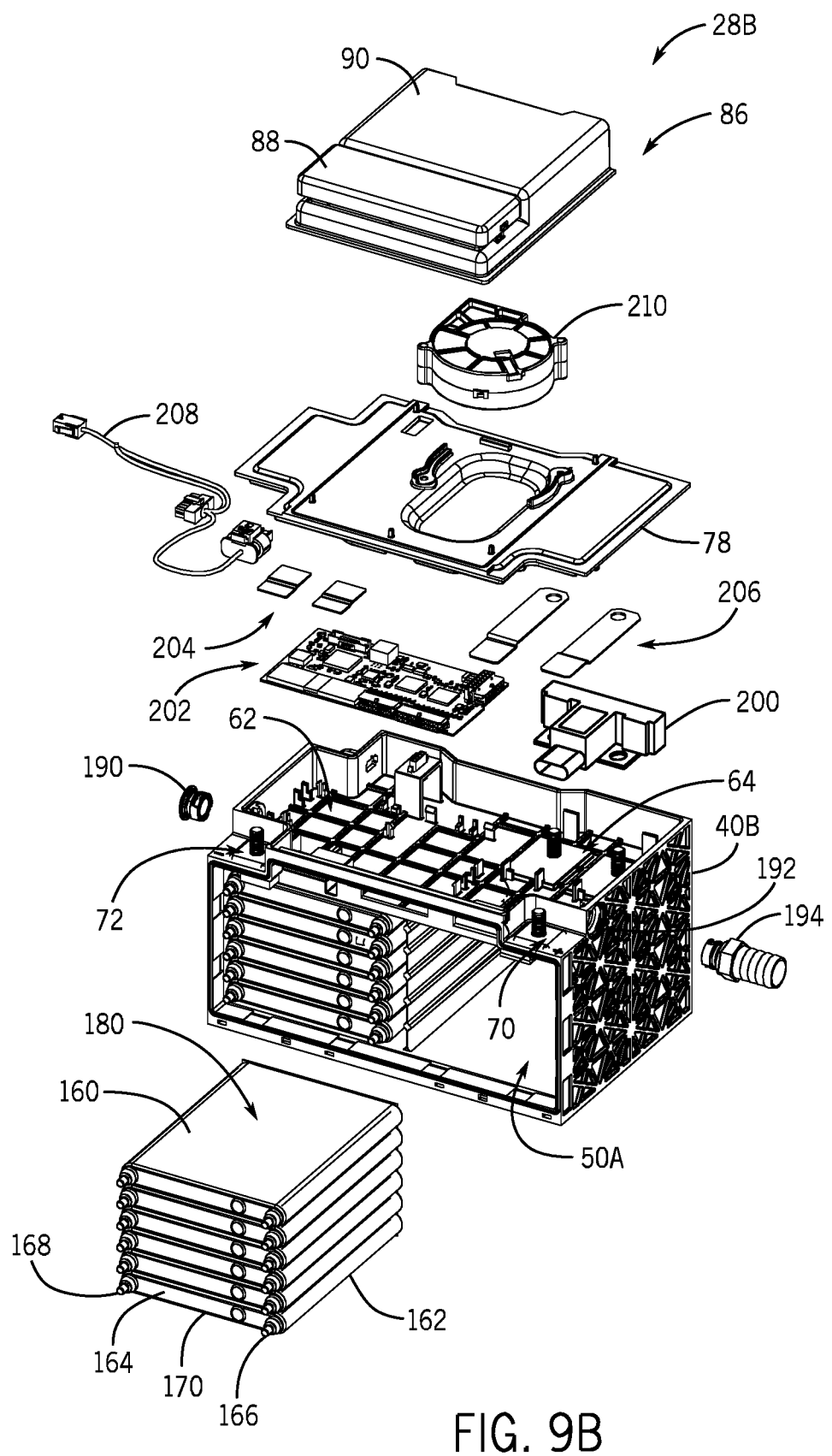
Figure 10A:
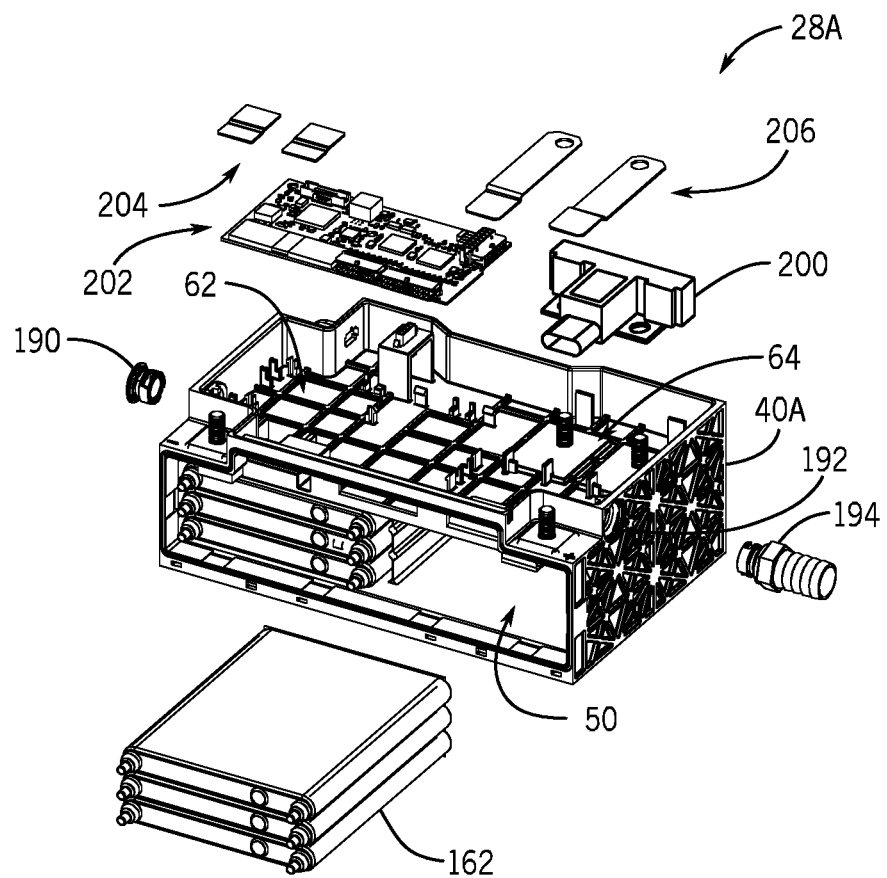
FIG. 10 (FIGS. 10A and 10B) is a combined exploded perspective view of the embodiments of the lithium ion battery modules of FIGS. 4 and 6 and highlighting various shared components between the modules, in accordance with an aspect of the present disclosure.
Figure 10B:
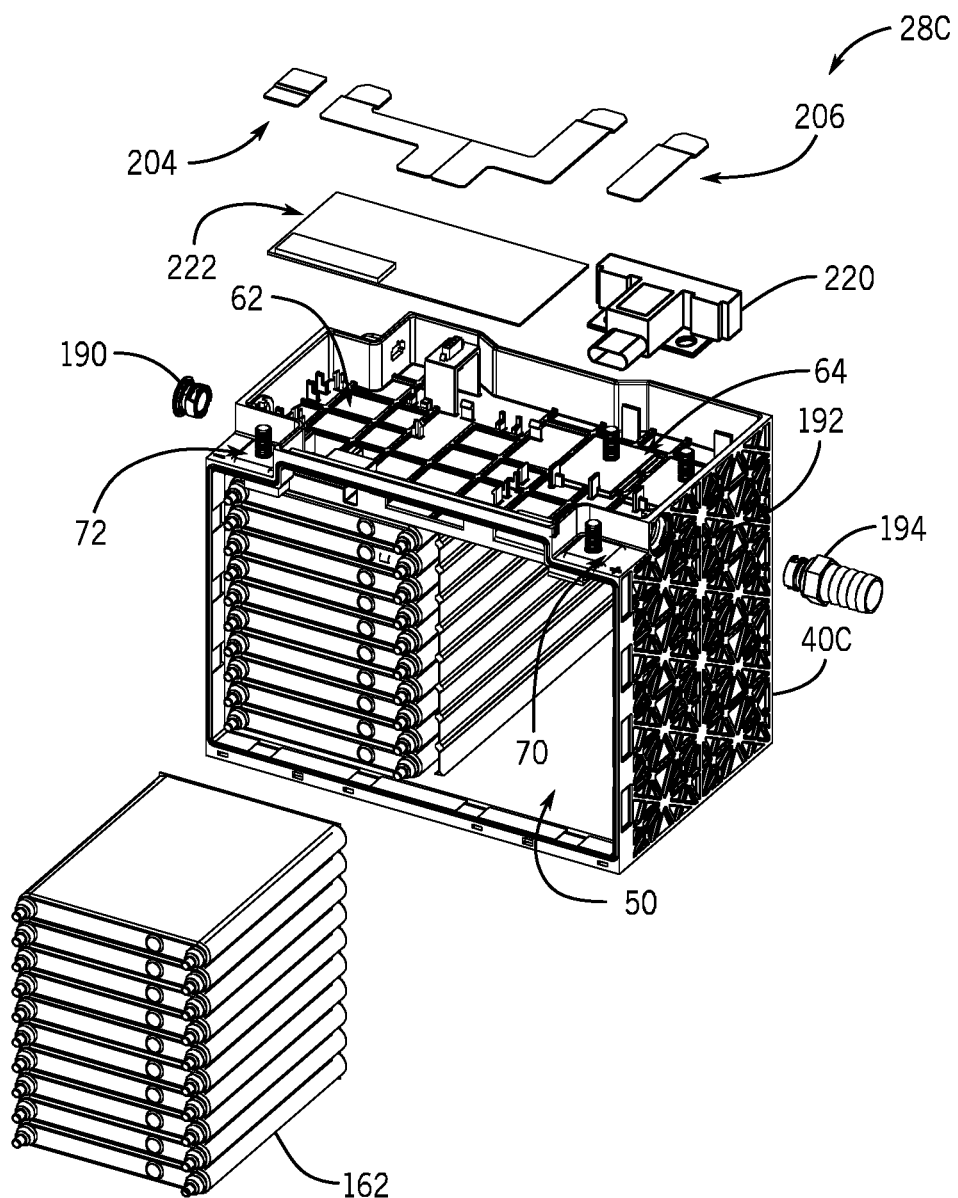

In accordance with an aspect of the present disclosure, one common layout for the different versions of the lithium ion battery module 28 may include an electrical layout 56 of the top region 48. For example, the electrical layout 56, as illustrated, may include first and second terminal regions 58, 60, corresponding to respective locations of a first terminal and second terminal (e.g., pairs of terminals, which are shown in FIG. 4) of the lithium ion battery module 28, the terminals being configured to provide an electrical output of the respective lithium ion battery modules 28. The illustrated electrical layout 56 also includes a control board region 62 corresponding to a location of a control board (where examples of the control board are shown in FIGS. 9 and 10), and a relay region 64 corresponding to a location of a relay. Examples of the relay are shown in FIGS. 9 and 10. It should be noted that the regions 58, 60, 62, 64 are not only locations corresponding to these components, but also may include certain features (e.g., receptacle areas, connectors, pegs, electrical traces) that enable that particular region to interface with these components, and, in certain embodiments enable them to interface and house the components in a particular way.

The sides of the lithium ion battery module 28 (e.g., the housing 40) may also be configured in this manner. For example, the left and/or right sides 44, 46 (located laterally with respect to the cell receptacle region 50) may include a vent region 66, corresponding to a location where gases may be vented out of the module 14. The vent region 66 may include one or more features configured to interface with, for example, vent plugs, vent adapters for hose connections of a vehicle, and the like. It should be noted that the disclosed embodiments are not limited to these regions and the particular components set forth above. Rather, there may be other features, including but not limited to those described in further detail below. For example, the lithium ion battery modules 28 configured in accordance with present embodiments may also include regions specifically configured to couple with other components, such as fans, fan filters, fan covers, thermal management features, and the like.

As set forth above, the base 42 of the lithium ion battery module 28 generally defines its footprint. With regard to vehicle integration, this can be an important design concern in that certain sizes for the base 42 may be desired for integration into a particular vehicle due to, for example, spatial constraints. Indeed, in embodiments where the xEV 10 of FIGS. 1 and 2 is a micro-hybrid, it may be desirable for the base 42 to be a size that enables the lithium ion battery module 28 to be located relatively close to a lead acid battery, close to an alternator, etc. Thus, the lithium ion battery module 28 may be a size that enables vehicle integration, as an example, under a hood of the xEV 10, or within a cage located toward a front of the xEV 10.

With this in mind, one aspect of the present disclosure provides embodiments in which first, second, and third types of the lithium ion battery module 28 may have substantially the same base configuration (e.g., substantially the same footprint). This aspect may be further appreciated with reference to FIGS. 4, 5, and 6, which respectively depict a first embodiment of the lithium ion battery module 28A, a second embodiment of the lithium ion battery module 28B, and a third embodiment of the lithium ion battery module 28C. Again, the base 42 may be represented by the dimensions of the portion of the battery module housing 40 that is ultimately mounted to or rests on a surface of the xEV 10 (e.g., closest to the ground/floor). In accordance with an embodiment, the respective housings 40 have bases 42 each having the same dimensions.

The base 42 may generally correspond to a length (L) and a width (W) of the lithium ion battery module 28, and the length and width of the respective bases of the first, second, and third embodiments of the lithium ion battery modules 28 may be the same, which is intended to account for manufacturing tolerances. Further, although the lithium ion battery modules 28 are intended to represent advanced battery modules having lithium ion electrochemical cells, the base 42 may correspond to any one of the many group representations (e.g., Battery Council International (BCI) group numbers, Deutsche Industrie Normen (DIN codes), European Norm (EN) codes) established for traditional lead acid batteries (e.g., lead acid battery module 30). Each group (e.g., group number) from these established set of standards has a standard length and width for the base of the particular battery corresponding to the particular group designation. The secondary lithium ion battery modules described herein may or may not have dimensions that substantially match or comply with the standard dimension requirements of at least a base of a known lead acid battery standard (e.g., a BCI group, DIN code, or EN code).

As one example, the first, second, and third embodiments of the lithium ion battery modules 28 of FIGS. 4-6 may be sized to have an H5 (DIN code) base, which is 242 mm in length by 175 mm in width. The H5 base is also commonly referred to as an LN2 base. However, the base 42 of the lithium ion battery modules 28 may have any length and width suitable to substantially match a particular base of a lead acid battery. Although standardized for lead acid batteries, it can be difficult to conform to such standards using lithium ion electrochemical cell technologies, especially when considering that lithium ion battery modules, such as those described herein, may be associated with equipment not found in traditional lead acid batteries such as intelligent control features, thermal management features, advanced venting features, and so forth. However, the present disclosure is not limited to the bases 42 of the lithium ion battery modules 28 being the same size as a lead acid standard. Rather, the lithium ion battery modules 28 may have any size for their respective bases 42, which in certain embodiments may be the same for the different lithium ion battery modules 28. As a non-limiting example, the length L may be a value between 150 mm and 450 mm, and the width W may be a value between 100 mm and 200 mm, where the values match for all the modular lithium ion battery modules 28.

While the lithium ion battery modules 28 of FIGS. 4-6 have aspects or features with the same configuration or layout (e.g., substantially the same base 42 or the same lateral arrangement of terminals), it should be noted that their respective heights (e.g., vertical profiles opposing respective bases of the housings) may differ, depending, for example, on their power components. For example, in FIG. 4, the lithium ion battery module 28 may have a first output voltage (e.g., 12 V) and a first capacity (e.g., 10 amp hours (Ah)). In FIG. 5, the lithium ion battery module 28 may have a second output voltage that is the same as the first output voltage while having a second capacity greater than the first capacity (e.g., 20 Ah). From a power component standpoint, the lithium ion battery module 28 of FIG. 5 differs from the first lithium ion battery module 28 of FIG. 4 by the number of total electrochemical cells in their respective housings 40. In one embodiment, the first embodiment of the lithium ion battery module 28A of FIG. 4 may include a first number (e.g., 6) of electrochemical cells electrically coupled in a serial arrangement, while the second embodiment of the lithium ion battery module 28B of FIG. 5, which has a larger capacity (e.g., twice the capacity), has a second number (e.g., 12) of the same type of electrochemical cells coupled using a combination of serial and parallel electrical connections. The arrangement of the electrochemical cells within the housings 40, which is described in further detail below, is the primary factor that causes a respective vertical profile, or height H1 of the lithium ion battery module 28 of FIG. 4 and a vertical profile, or respective height H2 of the lithium ion battery module 28 of FIG. 5 to differ. For the lithium ion battery module 28 in FIG. 4, its cell receptacle region 50 and, therefore, its housing 40, is configured to (e.g., sized to) receive (e.g., fit) a first number of prismatic electrochemical cells conforming to a set of manufacturing specifications, while the lithium ion battery module 28 of FIG. 5 has an embodiment of the housing 40 configured to (e.g., sized to) receive (e.g., fit) a second number of the prismatic electrochemical cells, the second number being greater than the first.

The third embodiment of the lithium ion battery module 28C of FIG. 6 has a significantly larger vertical profile or height H3, compared to the lithium ion battery modules 28 of FIGS. 4 and 5. This is due, at least in part, to the additional number of electrochemical cells required for the lithium ion battery module 28 to reach a higher voltage (e.g., 48 V using a third number, such as 20, of the same type of electrochemical cells connected in series). That is, the housing 40 of the third embodiment of the lithium ion battery module 28C may be configured to (e.g., sized to) receive (e.g., fit) the third number of prismatic electrochemical cells). It should be noted that the different lithium ion battery modules 28 of FIGS. 4-6 all utilize lithium ion electrochemical cells having standardized dimensions, which are dimensions that are intended to be produced for a particular electrochemical cell type, and is intended to allow for manufacturing tolerances. For instance, the electrochemical cells in some embodiments may be prismatic electrochemical cells that have standardized dimensions associated with a particular tolerance.

As will be appreciated from the present disclosure, the lithium ion battery modules 28 described herein may be modular not only from the standpoint of their electrochemical cells and their footprint (e.g., base 42), but also from the standpoint of their architecture and common components. For instance, the base 42 of each lithium ion battery module 28 is located at an end that is substantially opposite a location of a set of terminals of the lithium ion battery module 28, illustrated as a first terminal 70 (e.g., a positive terminal) and a second terminal 72 (e.g., a negative terminal), which are positioned in the first and second terminal regions 58, 60, respectively. The terminals 70, 72 may include a single component or a set of components that are common to (e.g., of the same type and configured to be interchangeably coupled to) the different lithium ion battery modules 28. Further, in accordance with certain embodiments, the first and second terminal regions 58, 60 are specifically configured to position terminal posts 74, 76 (e.g., an end of the terminal posts) of the first and second terminals 70, 72 at substantially the same level as a top cover 78 of the first lithium ion battery module 28 of FIG. 4, a top cover 80 of the second embodiment of the lithium ion battery module 28B of FIG. 5 (which may be the same as the top cover 78), and a top cover 82 of the third embodiment of the lithium ion battery module 28C of FIG. 6. In this regard, the terminal posts 74, 76 may not protrude beyond an outer surface of the lithium ion battery modules 28, which may reduce the likelihood that the terminals 74, 76 will be subjected to tangential forces, short circuits, and so forth, that could potentially damage the lithium ion battery modules 28. The terminal regions 58, 60 may, in some embodiments, be the same size for the different lithium ion battery modules 28, in terms of volume or any one of a length, width, height, or any combination thereof, to within manufacturing tolerances. In certain embodiments, a top cover (e.g., top cover 78) may be configured to interchangeably cover the top portions of the lithium ion battery modules 28A and 28B of FIGS. 4 and 5.

In the illustrated embodiments of FIGS. 4-6, immediately adjacent to the first terminal region 58 is the venting region 66 including a vent plug 84, which is a common component for the different lithium ion battery modules 28. The vent plug 84 may be configured to open a vent of the lithium ion battery module 28 after an internal portion of the housing 40 reaches a pressure threshold (e.g., as a result of a battery cell rupture).

The first and second embodiments of the lithium ion battery modules 28 in FIGS. 4 and 5, respectively, may include additional shared components. For example, the first and second embodiments of the lithium ion battery modules 28 of FIGS. 4 and 5, respectively, may include a common fan assembly 86, which may include a filter portion 88 including a fan filter, and a fan portion 90 including a fan. The common fan assembly 86 of the first and second embodiment of the lithium ion battery modules 28 of FIGS. 4 and 5 may also include a cover that is specifically configured (e.g., shaped and sized and having specific connection features) to couple with the respective top portions 48 of the first and second lithium ion battery modules 28 of FIGS. 4 and 5.

Figure 7:
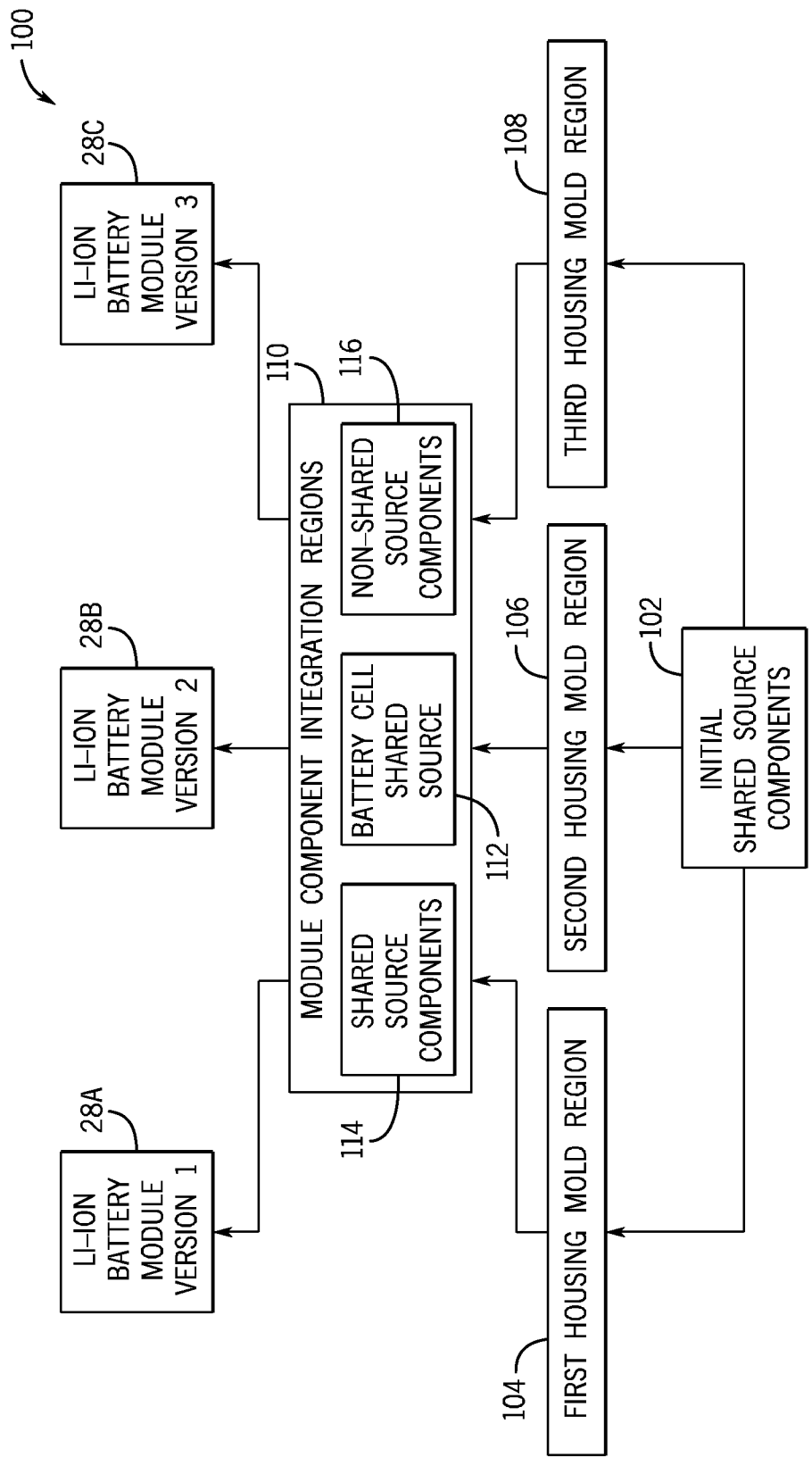
FIG. 7 is a block diagram representing an embodiment of a manufacturing system configured to produce a set of lithium ion battery modules having a plurality of common components, in accordance with an aspect of the present disclosure.

It is now recognized that the ability to utilize interchangeable and modular components across the different embodiments (i.e., types, versions) of the lithium ion battery modules 28 may result in the ability to manufacture the lithium ion battery modules 28 according to more efficient processes, such as performed by the embodiment of a manufacturing system 100 shown in FIG. 7. Such a process may be more efficient than a traditional manufacturing process in that different types of lithium ion battery modules may be formed using shared assembly regions, shared component sources, and so forth, which may reduce capital costs and increase the speed of manufacturing. The shared assembly regions and shared component sources may include common components of the same type, size, and overall configuration, to within manufacturing tolerances, that can be used in any one or a combination of different types of the lithium ion battery modules (e.g., lithium ion battery modules 28 having different output voltages, different capacities, and so forth).

As depicted, the manufacturing system 100 may include the use of an initial set of shared source components 102, which may include, for example, components that can be integrated into the respective housings 40 of the different lithium ion battery modules 28. For example, overmolded components such as terminals, structural support components, and the like, shared by the different lithium ion battery modules 28 may be incorporated into this particular portion of the system 100.

The initial shared source components 102 may be distributed among different areas of the manufacturing system 100 where the housings 40 may be produced. For example, the initial shared source components 102 (e.g., common heat sinks for in-molding with housings) may be distributed to a first housing mold region 104 where the housing 40 of the first embodiment of the lithium ion battery module 28A may be molded, to a second housing mold region 106 where the housing 40 of the second embodiment of the lithium ion battery module 28B may be molded, and/or to a third housing mold region 108 where the housing 40 of the third embodiment of the lithium ion battery module 28C may be molded. From these regions, the different module housings 40 may be provided to various module component integration regions 110, where different portions of the modules are provided to the housings 40 for module completion.

The module component integration regions 110 may include, as shown, a battery cell (electrochemical cell) shared source 112, which provides the same type of battery cell (e.g., prismatic lithium ion electrochemical cells having the same manufacturing specifications) to the different module housings 40 in their respective cell receptacle regions 50. Other shared source components 114 may be similarly provided, including fans, fan covers, fan filters, printed control boards, bus bars, vent plugs, and the like. Non-shared source components 116 provided at the regions 114 may include size-specific components, such as integrated bus bar and voltage sense carrier assemblies, certain types of relays, front covers, thermal gap pads, and the like. As a result of the integration of these various components into the three different housings 40, the first, second, and third embodiments of the lithium ion battery module 28, for example corresponding to the modules 28A-28C, respectively, are produced.

Figure 8:
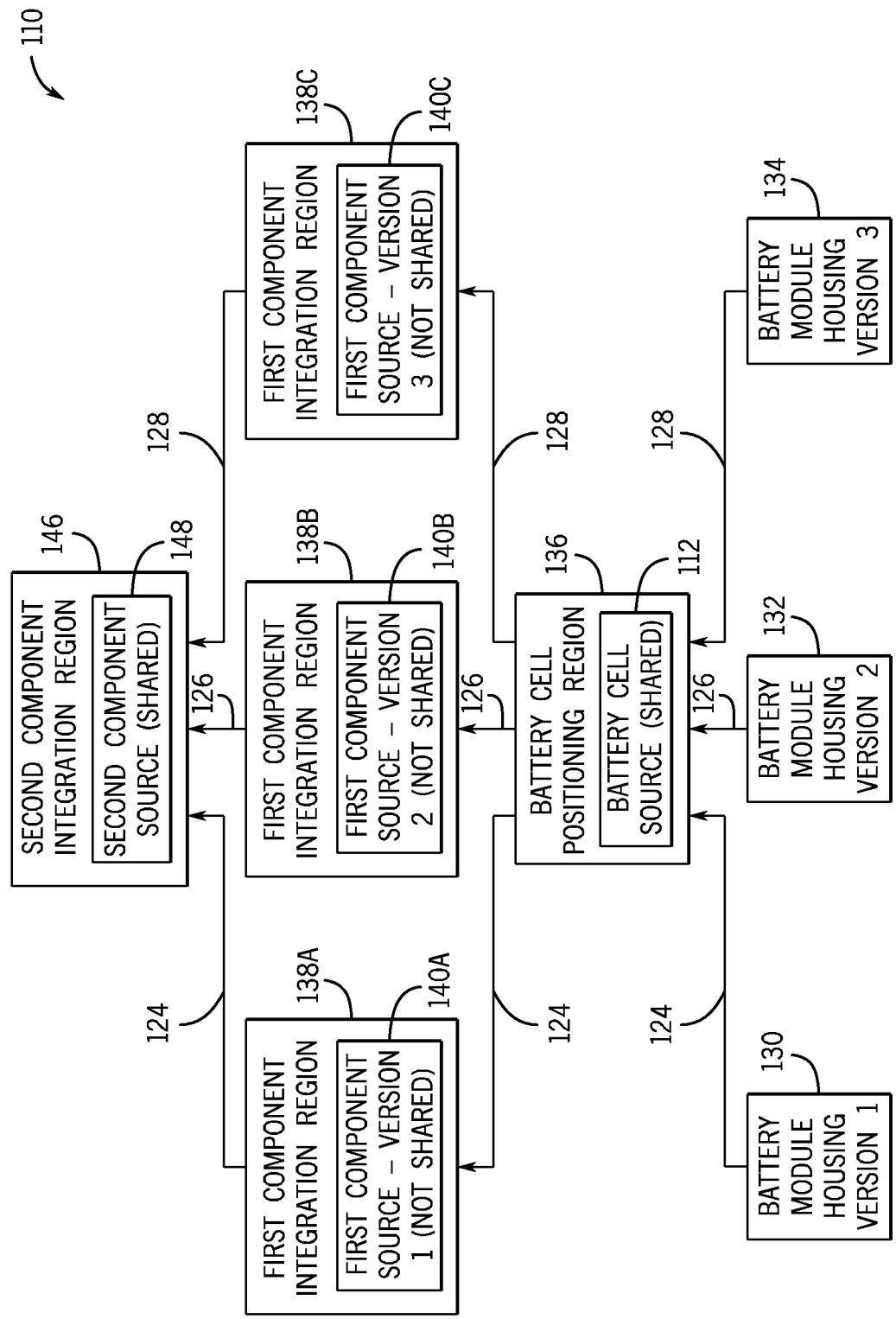
FIG. 8 is a block diagram representing an embodiment of a region of the manufacturing system of FIG. 7 in which various shared components may be incorporated into a variety of different lithium ion battery modules, in accordance with an aspect of the present disclosure.

An example embodiment of the component integration region 110 is depicted in FIG. 8. As shown, the region 110 includes a first path 124 that conveys intermediates for the first embodiment of the battery module 28A, a second path 126 that conveys intermediates for the second embodiment of the battery module 28B, and a third path 128 that conveys intermediates for the third embodiment of the battery module 28C, wherein the term "intermediates" refers to incomplete versions of the battery modules (e.g., the battery module housings 40 will some, but not all, of their respective components). As an example, the paths 124, 126, 128 may correspond to one or more conveyance paths, such as conveyor belts or the like, that traverse all or a portion of the region 110.

The illustrated embodiment includes a first version of the battery module housing 130 introduced along the first path 124, a second version of the battery module housing 132 introduced along the second path 126, and a third version of the battery module housing 134 introduced along the third path 128. The first, second, and third versions of the battery module housing 130, 132, 134 may correspond, for example, to as-formed versions of the battery module housing 40 shown in FIGS. 4, 5, and 6, respectively. The as-formed versions may be provided, for example, after molding the housings in the first, second, and third housing molding regions 104, 106, 108 of FIG. 7.

In the component integration region 110 of the system 100, the paths 124, 126, 128 may converge in regions where a common component is introduced to the different modules, while they diverge in regions where size-specific or other non-shared components are introduced to the modules 28. For example, as shown, the paths 124, 126, 128 convey the housings 40 to a battery cell positioning region 136 that uses the battery cell source 112. The battery cell positioning region 136, in certain embodiments, includes an automated system that positions battery cells in the housings 130, 132, 134 in a particular manner, for example in a specific orientation and in a specific number for the different embodiments of the battery module 28.

The paths 124, 126, 128 may then diverge from one another to separate respective sections of a first component integration region, depicted as region 138A for path 124, region 138B for path 126, and region 138C for path 128. The regions 138A-138C utilize different sources of a component not shared by the different lithium ion battery modules 28, including a first version of a first non-shared component 140A for region 138A, a second version of the first non-shared component 140B for region 138B, and a third version of the first non-shared component 140C. As an example, the different versions of the first non-shared component may include size-specific components, such as structural supports (carriers) for integrated bus bar and voltage sense assemblies for each lithium ion battery module 28, a front cover for each lithium ion battery module 28, and the like. It should be noted that conveyance of different partial battery module assemblies on an area for shared components may be avoided in accordance with present embodiments by distributing the shared components from a common source (i.e., a source of a set of the same type of component having the same dimensions and configuration, to within manufacturing tolerances).

The illustrated component integration region 110 may also include additional regions where common (i.e., interchangeably couplable) components are provided to the different types of the lithium ion battery module 28. Such embodiments are intended to be represented by a second component integration region 146 that utilizes a second shared component 148 (and/or source thereof), where the different types of the lithium ion battery module 28 may be fitted with common components, such as the same fan assemblies, the same bus bars, the same electrical connectors, and so forth. It should be noted that such modularity of the different versions of the lithium ion battery module 28 may be a result of all the lithium ion battery modules 28 having a corresponding region (e.g., a recess having a particular shape) for these different common components, including connectors, receptacles, spaces, or the like, that are specifically configured to receive the shared components. Further, the component integration region 110 may include more regions where additional components, from shared or non-shared sources of these components, may be used to integrate the components with the lithium ion battery modules 28.

The modular aspect of the lithium ion battery modules 28 described herein may be further appreciated with respect to FIGS. 9 and 10, which depict exploded perspective views of the first, second, and third embodiments of the lithium ion battery module 28A, 28B, and 28C, respectively. Specifically, as shown in FIG. 9, a comparison between the first and second lithium ion battery modules 28A, 28B demonstrates that the two modules 28 have a similar architecture, and have a number of shared components.

Starting from their respective housings 40A and 40B, it can be seen that while the respective heights H1, H2 (FIGS. 4 and 5) of the two are different, they actually have a very similar configuration. For example, the housing 40A of the first embodiment of the lithium ion battery module 28A and the housing 40B of the second embodiment of the lithium ion battery module 28B each have a layout including a plurality of regions (e.g., the terminal regions, the relay regions, and so forth). Each region of the plurality of regions has a particular location on the respective housings 40A, 40B, and is configured to mechanically couple to a particular component, such as control boards, relays, plugs, and so on. The particular locations and particular components of the plurality of regions of the first and second embodiments of the lithium ion battery modules 28A, 28B match (e.g., have the same corresponding location and the same type of component).

For instance, the illustrated lithium ion battery modules 28A, 28B include a common electrochemical cell 160, meaning that the electrochemical cells 160 used in the different embodiments of the lithium ion battery modules 28 have the same manufacturing specifications, including the same chemistry (e.g., cathode and anode electrode active materials, electrolyte, additives) and the same size manufacturing specifications, to within a specified tolerance. In accordance with an aspect of the present disclosure, it is now recognized that certain types of electrochemical cells may benefit such approaches more than others. For example, in one embodiment, the electrochemical cells 160 may have a particular combination of anode active materials (e.g., including $Li_4Ti_5O_{12}$, which is lithium titanate (LTO)) and cathode active materials (e.g., including $LiNi_{1/3}Co_{1/3}Mn_{1/3}O_2$, which is nickel cobalt manganese oxide (NMC)) that prevent them from swelling beyond a predetermined threshold. For example, in the illustrated embodiments, the electrochemical cells 160 have a prismatic casing 162. The prismatic casings 162 are subject to, and may conform to, a set of manufacturing specifications, including their size in all dimensions.

The prismatic casings 162 include a top casing portion 164 where a set of cell terminals 166, 168 (e.g., positive and negative cell terminals) are located. One or more cell vents 170 may also be located on the top casing portion 164. The set of cell terminals 166, 168 for each of the electrochemical cells 160 enables the cells to be electrically connected to various electrical components, including each other, to the terminals 70, 72 of the lithium ion battery module 28, and a load to which the lithium ion battery module 28 may be coupled. The cell vents 170 are configured to enable venting of gases under certain conditions.

The prismatic cell casings 162 also include a bottom casing portion 172 positioned opposite the top casing portion 164, first and second rounded sides 174, 176 that extend between the bottom and top casing portions 172, 164 proximate the cell terminals 166, 168, and first and second faces 178, 180 that couple the first and second rounded sides 174, 176 at opposing ends of each cell 160. The presently disclosed configurations may be, in some embodiments, facilitated by the presently illustrated orientation of the electrochemical cells 160 within the housings 40. Specifically, the electrochemical cells 160, which are prismatic in FIGS. 9 and 10, are situated in the housings 40 with their respective sets of terminals 166, 168 pointed outward from the cell receptacle regions 50. Further, the electrochemical cells 160 rest on one of their two faces 178, 180 within the lithium ion battery modules 28, and the electrochemical cells are in a stacked arrangement in which the faces 178, 180 are oriented substantially parallel with respect to one another in a particular column 182 having a plurality (i.e., more than one) electrochemical cells 160. In the embodiments illustrated in FIGS. 9 and 10, the electrochemical cells 160 are arranged in two such columns 182, with the number of rows depending on the number of total electrochemical cells 160.

Such an arrangement may be desirable, for example, to maintain standard dimensions for the base 42 across the different embodiments of the lithium ion battery modules 28. Indeed, it is now recognized that a combination of the cell chemistry (e.g., NMC/LTO electrochemical cells), cell shape (e.g., prismatic), and cell size may provide advantages that have not traditionally been used to achieve the technical effects set forth herein. For example, it is now recognized that NMC/LTO electrochemical cells may enable a total cell volume to be defined for the housing, and the remaining layout of the battery modules 28 to be defined relative to this volume.

As noted above, the terminals 70, 72 of the lithium ion battery modules 28 are all the same across the different embodiments described above with respect to FIGS. 4-6. In addition, their illustrated vent configurations are also the same—where the battery modules 28 may use the same type of closure, securement, and venting features, such as a common set of threads and screws, a common side plug 190, and a common vent opening 192 into which a common barbed fitting 194 of a corresponding size may be used to enable the vent opening 192 to be coupled to a vent hose of the xEV 10 (where the xEV is shown in FIG. 2). As an example, the first and second embodiments of the lithium ion battery module 28A, 28B, may each include a respective set of common components, and the common components may represent between 60% and 95% of a total part count of the first and second embodiments of the lithium ion battery modules 28A, 28B. For example, the common components may represent between 60% and 90% of the total part count, between 65% and 85% of the total part count, or between 70% and 80% of the total part count of the lithium ion battery modules 28A, 28B.

Further, it should be noted that the respective layouts of the different lithium ion battery modules 28 described herein are substantially the same. For example, the relative location of the components of the different embodiments of the lithium ion battery modules 28 is the same (i.e., matching) for each module 28. This includes, for example, the regions described above with respect to FIG. 3.

With respect to their electrical components, the first and second embodiments of the lithium ion battery modules 28 include a common relay 200 configured to electrically couple and de-couple one of the terminals (e.g., the first terminal 70) to an electrical load, and a common set of electronics 202. The electronics 202 may include the same shape and size of circuit board, as well as the same electrical architecture (e.g., components, location, and connections) and layout. For instance, a single source of the electronics 202 is intended to be appropriately used in either the first embodiment or the second embodiment of the lithium ion battery module 28. The electronics 202 may include a control board, as shown, as well as various short circuit protection circuitry, a battery control module including control circuitry configured to control operational parameters of the battery modules 28, and so forth.

The modularity of the present approaches is reflected in the different regions of the housings 40, as well. For instance, the top portions 48 of the housings 40 also include the control board region 62 and the relay region 64, which are all the same layout and configuration for the first and second embodiments of the lithium ion battery module 28. That is, the control board region 62 for both the first and second embodiments of the lithium ion battery module 28 includes the same arrangement of prongs, connectors, and so forth, that enable the top portion 48 to mechanically couple to and secure the set of electronics 202. In addition, the relay region 64 for both the first and second embodiments of the lithium ion battery module 28 includes the same arrangement of prongs, connectors, and so forth, that enable the top portion 48 to mechanically couple to and secure the relay 200 (i.e., the same type and configuration of relay). It should be noted that such common configurations may enhance manufacturing capability, even for different housing molds. For example, the top portion 48 of the different lithium ion battery modules 28 may be the same, meaning that if the housing 40, or the portion of the housings illustrated, are formed from different pieces, the top portion 48 may be produced at a common source. Further, in embodiments where the housings 40 are one-piece molded units, then the mold tools used to mold the housings 40 may utilize the same types of equipment, for example the same portion of the mold tool used to form the top portion 48.

Other illustrated and common electrical components include shunt bridges 204 and relay bus bars 206. Indeed, various other connectors and features may also be common to two or more of the lithium ion battery modules 28. For example, the first and second embodiments of the lithium ion battery modules 28 may include a common low voltage connector 208 that may be used to electrically couple the relay 200 to certain components, for example to couple the lithium ion battery module 28 to the xEV 10, and/or to electrically couple a common fan 210 to the lithium ion battery module 28 to power the fan 210.

The top cover 78, over which the fan 210 is disposed, is also common for the first and second embodiments of the lithium ion battery modules 28. Further, as noted above, the fan assembly 86 is also common between the two, including a fan filter 212. The manner in which a back cover 214 of the fan assembly 86 interfaces with the first and second embodiments of the lithium ion battery modules 28 may also be the same.

The third embodiment of the lithium ion battery module 28C, as shown in FIG. 10, also includes common components as set forth above. Indeed, in addition to having the same general layout as set forth above for the first and second embodiments of the lithium ion battery module 28A, 28B, the third embodiment of the lithium ion battery module 28C also uses the same shunt bridge 204, relay bus bar 206, terminals 70, 72, side plugs 190, and barbed fittings 194, among others. As noted above, the modular aspect of the lithium ion battery modules 28 also includes the use of the common electrochemical cell 160.

Furthermore, while a respective relay 220 and a respective set of electronics 222 may be different for the third embodiment of the lithium ion battery module 28C compared to others, the relative layout and placement of these features on its respective top portion 48 of the housing 40 is substantially the same (i.e., matches the first and second embodiments of the lithium ion battery modules 28A-28C). Furthermore, because these components are different, the electronics region 62 and the relay region 64 of the third embodiment of the lithium ion battery module 28C may be different compared to the others illustrated. For example, its layout of connectors, prongs, and so forth, may be different but generally located in a matching position as set forth for modules 28A and 28B.

One or more of the disclosed embodiments, alone or on combination, may provide one or more technical effects including the use of a number of shared components across different battery modules having different electrical characteristics. For example, two or more battery modules, each having a different number of electrochemical cells, may include a number of components that are provided by a common source. The use of such common components facilitates manufacturing and reduces associated costs by enabling faster manufacture and greater compatibility between battery modules. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method of manufacturing lithium ion battery modules, the method comprising:
providing a first battery module subassembly on a first manufacturing path, the first battery module subassembly including a first housing having a first dimension, a second dimension, and a third dimension;
providing a second battery module subassembly on a second manufacturing path different from the first manufacturing path, the second battery module subassembly including a second housing having the first dimension, the second dimension, and a fourth dimension different than the third dimension;
converging the first manufacturing path and the second manufacturing path to a battery cell positioning region that includes a common battery cell source;
at the battery cell positioning region,
placing a first plurality of battery cells from the common battery cell source in the first battery module subassembly, and
placing a second plurality of battery cells from the common battery cell source in the second battery module subassembly, wherein a number of the second plurality of battery cells is different from a number of the first plurality of battery cells;
diverging the first manufacturing path from the second manufacturing path after the battery cell positioning region;
at a first component integration region in the first manufacturing path, the first component integration region having a first component source, assembling a first component of the first component source with the first battery module subassembly;
at a second component integration region in the second manufacturing path, the second component integration region having a second component source different from the first component source, assembling a second component of the second component source with the second battery module subassembly; and
concluding the first manufacturing path and the second manufacturing path to result in a first battery module and a second battery module.

2. The method of manufacturing lithium ion battery modules of claim 1, wherein the first component integration region and the second component integration region are after diverging the first manufacturing path from the second manufacturing path after the battery cell positioning region.

3. The method of manufacturing lithium ion battery modules of claim 1, wherein the first component includes a first version of a component, and wherein the second component includes a second version of the component.

4. The method of manufacturing lithium ion battery modules of claim 1, while the first manufacturing path and the second manufacturing path are converged, at a third component integration region in the converged path, the first component integration region having a third component source, assembling a third component of the third component source with the first battery module subassembly, and assembling the third component of the third component source with the second battery module subassembly.

5. The method of manufacturing lithium ion battery modules of claim 1, wherein the battery cell positioning region includes an automated system that positions battery cells in the first housing and the second housing in a particular manner.

6. The method of manufacturing lithium ion battery modules of claim 1, wherein the first battery module is a first voltage battery module and the second battery module is a second voltage battery module different than the first voltage battery module.

7. The method of manufacturing lithium ion battery modules of claim 6, wherein a voltage of the first voltage battery module is 12 volts, and a voltage of the second battery module is a multiple of 12 volts.

8. The method of manufacturing lithium ion battery modules of claim 1, wherein the first battery module is a first capacity battery module and the second battery module is a second capacity battery module different than the first capacity battery module.

9. The method of manufacturing lithium ion battery modules of claim 8, wherein the second capacity is a multiple of the first capacity.

10. The method of manufacturing lithium ion battery modules of claim 1, wherein the first dimension is a length, the second dimension is a width, and the third dimension and the fourth dimension are a first height and a second height, respectively.

11. The method of manufacturing lithium ion battery modules of claim 1, wherein providing the first battery module subassembly on a first manufacturing path includes,
providing a third component from a shared component source, at a first molding region in the first manufacturing path, molding the first housing with the third component, and
wherein providing the second battery module subassembly on a second manufacturing path includes,
providing a fourth component from the shared component source, the fourth component being the same as the third component, and at a second molding region in the second manufacturing path, molding the second housing with the fourth component.

* * * * *